T. C. BARNARD.
Devices for Hanging Picture Frames.
No. 142,981. Patented September 23, 1873.
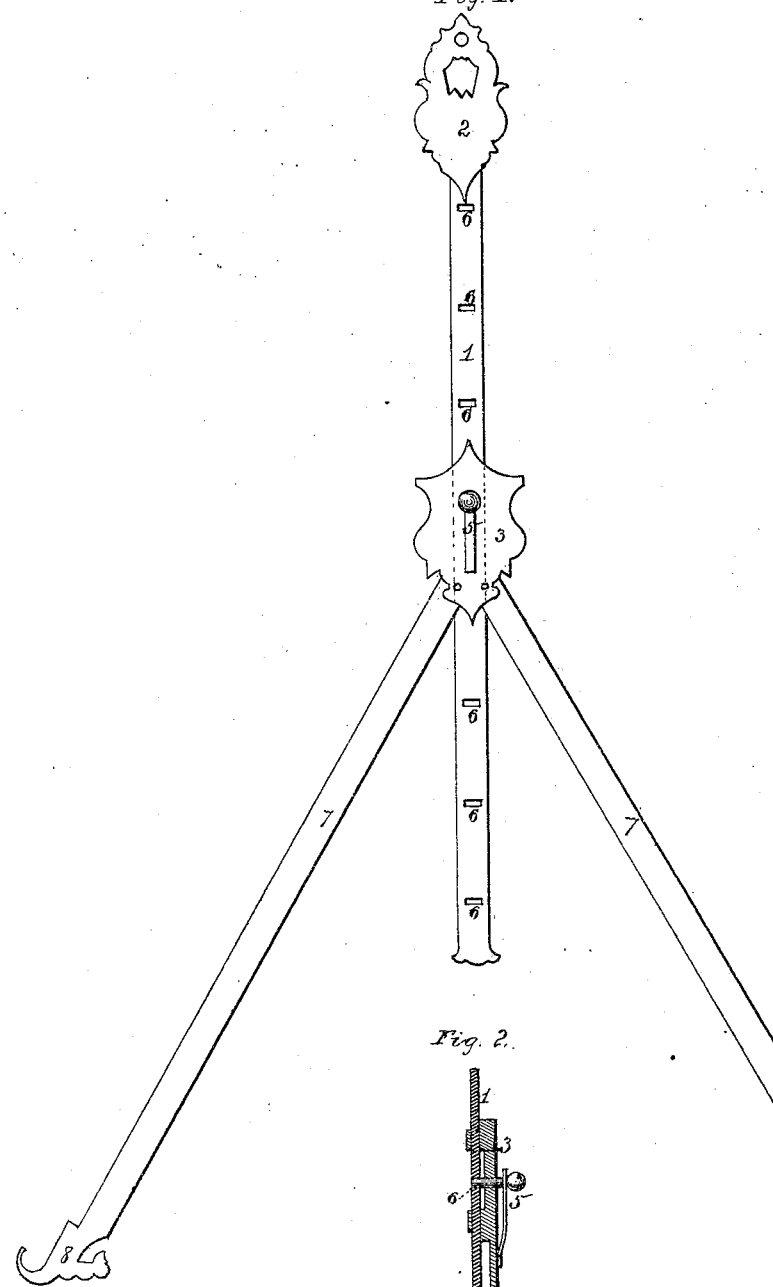
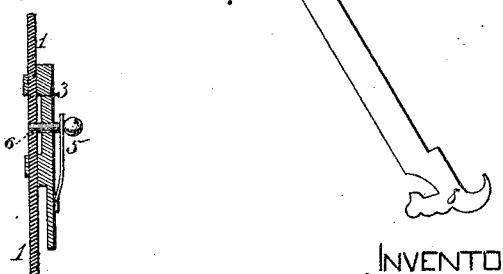
WITNESSES.  INVENTOR.

UNITED STATES PATENT OFFICE.

THEODORE C. BARNARD, OF WEST MERIDEN, CONNECTICUT.

IMPROVEMENT IN DEVICES FOR HANGING PICTURE-FRAMES.

Specification forming part of Letters Patent No. 142,981, dated September 23, 1873; application filed July 29, 1873.

*To all whom it may concern:*

Be it known that I, THEODORE C. BARNARD, of West Meriden, in the county of New Haven and State of Connecticut, have invented certain new and useful Improvements in Devices for Hanging Picture-Frames; and I do hereby declare the following to be a full, clear, and exact description of the invention, such as will enable others skilled in the art to which it pertains to make and use it, reference being had to the accompanying drawings, which form part of this specification.

The nature of my invention relates to an improved device for hanging picture-frames; and it consists in three metallic rods, two of which are pivoted to a frame which is vertically adjustable upon the third one, which is suspended from the nail. The two rods pivoted to the frame are freely adjustable laterally, so as to be adapted to frames of all kinds and sizes, and are provided upon their ends with suitable hooks, upon which the frame is hung.

The accompanying drawings represent my invention.

1 represents a metallic rod of any suitable size and length, provided with the ornamental, perforated head-piece 2, which passes over the head of the nail and holds the bar suspended in position. Sliding up and down upon this bar or rod 1 is the frame 3, provided with a spring-catch, 5, which catches in the holes 6 through the rod 1, and holds the frame in any desired position. Pivoted to the lower edge of the frame are the two rods 7, which are freely adjustable sidewise, so as to suit all sizes of frames, and which have hooks 8 formed upon their ends, from which the frames are suspended. By moving the frame 3 up or down upon the rod 1, the same effect is produced as that of lengthening or shortening a cord by which the picture is suspended.

Each of the parts of my device is made of metal or any other suitable material, and is intended to be ornamented with any suitable figures, or in any other manner that may be preferred.

Having thus described my invention, I claim—

1. The pivoted arms 7, in combination with the vertical rod 1, and a suitable adjusting device for adjusting the arms 7 up and down, substantially as set forth.

2. The combination of the perforated rod 1, slide 3, and hooked suspension-rods 7, substantially as specified.

In testimony that I claim the foregoing I have hereunto set my hand this 16th day of July, 1873.

THEODORE C. BARNARD.

Witnesses:
FRANK G. OTIS,
A. R. HUNN.